(12) United States Patent
Kuzma

(10) Patent No.: US 7,563,363 B2
(45) Date of Patent: Jul. 21, 2009

(54) SYSTEM FOR TREATING WASTEWATER

(75) Inventor: Matthew J. Kuzma, Seattle, WA (US)

(73) Assignee: Siemens Water Technologies Corp., Warrendale, PA (US)

( * ) Notice: Subject to any disclaimer, the term of this patent is extended or adjusted under 35 U.S.C. 154(b) by 143 days.

(21) Appl. No.: 11/543,006

(22) Filed: Oct. 4, 2006

(65) Prior Publication Data
US 2007/0075017 A1 Apr. 5, 2007

Related U.S. Application Data

(60) Provisional application No. 60/723,745, filed on Oct. 5, 2005.

(51) Int. Cl.
B01D 21/30 (2006.01)

(52) U.S. Cl. .................. 210/143; 210/194; 210/196; 210/220

(58) Field of Classification Search ............. 210/220, 210/194–196, 143
See application file for complete search history.

(56) References Cited

U.S. PATENT DOCUMENTS

| | | | |
|---|---|---|---|
| 256,008 A | 4/1882 | Leak | |
| 285,321 A | 9/1883 | Tams | |
| 1,997,074 A | 4/1935 | Novotny | |
| 2,080,783 A | 5/1937 | Petersen | |
| 2,105,700 A | 1/1938 | Ramage | |
| 2,843,038 A | 7/1958 | Manspeaker | |
| 2,926,086 A | 2/1960 | Chenicek et al. | |
| 3,183,191 A | 5/1965 | Hach | |
| 3,198,636 A | 8/1965 | Bouthilet | |
| 3,228,876 A | 1/1966 | Mahon | |
| 3,442,002 A | 5/1969 | Geary et al. | |
| 3,462,362 A | 8/1969 | Kollsman | |
| 3,492,698 A | 2/1970 | Geary et al. | |
| 3,556,305 A | 1/1971 | Shorr | |
| 3,591,010 A | 7/1971 | Pall | |
| 3,625,827 A | 12/1971 | Wildi et al. | |
| 3,654,147 A | 4/1972 | Levin et al. | |
| 3,693,406 A | 9/1972 | Tobin, III | |
| 3,700,561 A | 10/1972 | Ziffer | |
| 3,708,071 A | 1/1973 | Crowley | |
| 3,728,256 A | 4/1973 | Cooper | |
| 3,763,055 A | 10/1973 | White et al. | |
| 3,791,631 A | 2/1974 | Meyer | |
| 3,804,258 A | 4/1974 | Okuniewski et al. | |
| 3,843,809 A | 10/1974 | Luck | |

(Continued)

FOREIGN PATENT DOCUMENTS

AU 34400/84 9/1983

(Continued)

OTHER PUBLICATIONS

Almulla et al., Desalination, 153 (2002), pp. 237-243.

(Continued)

Primary Examiner—Chester T Barry

(57) ABSTRACT

The invention is directed to a method an apparatus for treating wastewater. The wastewater treatment system includes an aeration system that cycles between biological multiple biological basins. The system also includes one or more membrane basins. A method of the invention includes controlling the introduction of air into each biological basin in response to one or more operating conditions.

13 Claims, 4 Drawing Sheets

U.S. PATENT DOCUMENTS

| | | |
|---|---|---|
| 3,876,738 A | 4/1975 | Marinaccio et al. |
| 3,955,998 A | 5/1976 | Clampitt et al. |
| 3,968,192 A | 7/1976 | Hoffman, III et al. |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,731 A | 8/1978 | Yamazaki |
| 4,107,043 A | 8/1978 | McKinney |
| 4,138,460 A | 2/1979 | Tigner |
| 4,183,890 A | 1/1980 | Bollinger |
| 4,188,817 A | 2/1980 | Steigelmann |
| 4,190,411 A | 2/1980 | Fujimoto |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,302,336 A | 11/1981 | Kawaguchi et al. |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,369,605 A | 1/1983 | Opersteny et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,407,975 A | 10/1983 | Yamaguchi |
| 4,414,113 A | 11/1983 | LaTerra |
| 4,414,172 A | 11/1983 | Leason |
| 4,431,545 A | 2/1984 | Pall et al. |
| 4,451,369 A | 5/1984 | Sekino et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Müller |
| 4,519,909 A | 5/1985 | Castro |
| 4,540,490 A | 9/1985 | Shibata et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schleuter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,904,426 A | 2/1990 | Lundgard et al. |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,963,304 A | 10/1990 | Im et al. |
| 4,968,430 A | 11/1990 | Hildenbrand et al. |
| 4,968,733 A | 11/1990 | Muller et al. |
| 4,969,997 A | 11/1990 | Klüver et al. |
| 4,988,444 A | 1/1991 | Applegate et al. |
| 4,999,038 A | 3/1991 | Lundberg |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Müller et al. |
| 5,066,402 A | 11/1991 | Anselme et al. |
| 5,069,065 A | 12/1991 | Sprunt et al. |
| 5,075,065 A | 12/1991 | Effenberger et al. |
| 5,076,925 A | 12/1991 | Roesink et al. |
| 5,079,272 A | 1/1992 | Allegrezza et al. |
| 5,094,750 A | 3/1992 | Kopp et al. |
| 5,094,867 A | 3/1992 | Detering et al. |
| 5,098,567 A | 3/1992 | Nishiguchi |
| 5,104,535 A | 4/1992 | Cote et al. |
| 5,104,546 A | 4/1992 | Filson et al. |
| H1045 H | 5/1992 | Wilson |
| 5,135,663 A | 8/1992 | Newberth, III et al. |
| 5,137,631 A | 8/1992 | Eckman et al. |
| 5,138,870 A | 8/1992 | Lyssy |
| 5,147,553 A | 9/1992 | Waite |
| 5,151,191 A | 9/1992 | Sunaoka et al. |
| 5,151,193 A | 9/1992 | Grobe et al. |
| 5,158,721 A | 10/1992 | Allegrezza, Jr. et al. |
| 5,169,528 A | 12/1992 | Karbachsch et al. |
| 5,182,019 A | 1/1993 | Cote et al. |
| 5,192,442 A | 3/1993 | Piccirillo et al. |
| 5,192,456 A | 3/1993 | Ishida et al. |
| 5,192,478 A | 3/1993 | Caskey |
| 5,194,149 A | 3/1993 | Selbie et al. |
| 5,198,116 A | 3/1993 | Comstock et al. |

| | | | | | |
|---|---|---|---|---|---|
| 5,198,162 A | 3/1993 | Park et al. | 5,958,243 A | 9/1999 | Lawrence et al. |
| 5,209,852 A | 5/1993 | Sunaoka et al. | 5,968,357 A | 10/1999 | Doelle et al. |
| 5,211,823 A | 5/1993 | Giuffrida et al. | 5,988,400 A | 11/1999 | Karachevtcev et al. |
| 5,221,478 A | 6/1993 | Dhingra et al. | 5,997,745 A | 12/1999 | Tonelli et al. |
| 5,227,063 A | 7/1993 | Langerak et al. | 6,017,451 A | 1/2000 | Kopf |
| 5,248,424 A * | 9/1993 | Cote et al. ............... 210/636 | 6,024,872 A | 2/2000 | Mahendran et al. |
| 5,262,054 A | 11/1993 | Wheeler | 6,036,030 A | 3/2000 | Stone et al. |
| 5,271,830 A | 12/1993 | Faivre et al. | 6,039,872 A | 3/2000 | Wu et al. |
| 5,275,766 A | 1/1994 | Gadkaree et al. | 6,042,677 A | 3/2000 | Mahendran et al. |
| 5,286,324 A | 2/1994 | Kawai et al. | 6,045,698 A | 4/2000 | Côté et al. |
| 5,290,457 A | 3/1994 | Karbachsch et al. | 6,045,899 A | 4/2000 | Wang et al. |
| 5,297,420 A | 3/1994 | Gilliland et al. | 6,048,454 A | 4/2000 | Jenkins |
| 5,316,671 A | 5/1994 | Murphy | 6,048,455 A | 4/2000 | Janik |
| 5,320,760 A | 6/1994 | Freund et al. | 6,066,401 A | 5/2000 | Stilburn |
| 5,353,630 A | 10/1994 | Soda et al. | 6,074,718 A | 6/2000 | Puglia et al. |
| 5,358,732 A | 10/1994 | Seifter et al. | 6,077,435 A | 6/2000 | Beck et al. |
| 5,361,625 A | 11/1994 | Ylvisaker | 6,083,393 A | 7/2000 | Wu et al. |
| 5,364,527 A | 11/1994 | Zimmerman et al. | 6,096,213 A | 8/2000 | Radovanovic et al. |
| 5,364,529 A | 11/1994 | Morin et al. | 6,113,782 A | 9/2000 | Leonard |
| 5,374,353 A | 12/1994 | Murphy | 6,120,688 A | 9/2000 | Daly et al. |
| 5,389,260 A | 2/1995 | Hemp et al. | 6,126,819 A | 10/2000 | Heine et al. |
| 5,393,433 A | 2/1995 | Espenan et al. | 6,146,747 A | 11/2000 | Wang et al. |
| 5,396,019 A | 3/1995 | Sartori et al. | 6,149,817 A | 11/2000 | Peterson et al. |
| 5,401,401 A | 3/1995 | Hickok et al. | 6,156,200 A | 12/2000 | Zha et al. |
| 5,401,405 A | 3/1995 | McDougald | 6,159,373 A | 12/2000 | Beck et al. |
| 5,403,479 A | 4/1995 | Smith et al. | 6,193,890 B1 | 2/2001 | Pedersen et al. |
| 5,405,528 A | 4/1995 | Selbie et al. | 6,202,475 B1 | 3/2001 | Selbie et al. |
| 5,411,663 A | 5/1995 | Johnson | 6,214,231 B1 | 4/2001 | Cote et al. |
| 5,417,101 A | 5/1995 | Weich | 6,214,232 B1 | 4/2001 | Baurmeister et al. |
| 5,419,816 A | 5/1995 | Sampson et al. | 6,221,247 B1 | 4/2001 | Nemser et al. |
| 5,451,317 A | 9/1995 | Ishida et al. | 6,245,239 B1 | 6/2001 | Cote et al. |
| 5,468,397 A | 11/1995 | Barboza et al. | 6,254,773 B1 | 7/2001 | Biltoft |
| 5,470,469 A | 11/1995 | Eckman | 6,264,839 B1 | 7/2001 | Mohr et al. |
| 5,477,731 A | 12/1995 | Mouton | 6,277,512 B1 | 8/2001 | Hamrock et al. |
| 5,479,590 A | 12/1995 | Lin | 6,280,626 B1 | 8/2001 | Miyashita et al. |
| 5,480,553 A | 1/1996 | Yamamori et al. | 6,284,135 B1 | 9/2001 | Ookata |
| 5,484,528 A | 1/1996 | Yagi et al. | 6,290,756 B1 | 9/2001 | Macheras et al. |
| 5,490,939 A | 2/1996 | Gerigk et al. | 6,294,039 B1 | 9/2001 | Mahendran et al. |
| 5,491,023 A | 2/1996 | Tsai et al. | 6,299,773 B1 | 10/2001 | Takamura et al. |
| 5,501,798 A | 3/1996 | Al-Samadi et al. | 6,303,026 B1 | 10/2001 | Lindbo |
| 5,525,220 A | 6/1996 | Yagi et al. | 6,303,035 B1 | 10/2001 | Cote et al. |
| 5,531,848 A | 7/1996 | Brinda et al. | 6,315,895 B1 | 11/2001 | Summerton et al. |
| 5,531,900 A | 7/1996 | Raghavan et al. | 6,322,703 B1 | 11/2001 | Taniguchi et al. |
| 5,543,002 A | 8/1996 | Brinda et al. | 6,325,928 B1 | 12/2001 | Pedersen et al. |
| 5,552,047 A | 9/1996 | Oshida et al. | 6,337,018 B1 | 1/2002 | Mickols |
| 5,554,283 A | 9/1996 | Brinda et al. | RE37,549 E | 2/2002 | Mahendran et al. |
| 5,556,591 A | 9/1996 | Jallerat et al. | 6,354,444 B1 | 3/2002 | Mahendran et al. |
| 5,575,963 A | 11/1996 | Soffer et al. | 6,361,695 B1 | 3/2002 | Husain et al. |
| 5,597,732 A | 1/1997 | Bryan-Brown | 6,368,819 B1 | 4/2002 | Gaddy et al. |
| 5,607,593 A | 3/1997 | Cote et al. | 6,375,848 B1 | 4/2002 | Cote et al. |
| 5,639,373 A | 6/1997 | Mahendran et al. | 6,387,189 B1 | 5/2002 | Gröschl et al. |
| 5,643,455 A | 7/1997 | Kopp et al. | 6,402,955 B2 | 6/2002 | Ookata |
| 5,647,988 A | 7/1997 | Kawanishi et al. | 6,406,629 B1 | 6/2002 | Husain et al. |
| 5,670,053 A | 9/1997 | Collentro et al. | 6,423,214 B1 | 7/2002 | Lindbo |
| 5,677,360 A | 10/1997 | Yamamori et al. | 6,423,784 B1 | 7/2002 | Hamrock et al. |
| 5,688,460 A | 11/1997 | Ruschke | 6,432,310 B1 | 8/2002 | Andou et al. |
| 5,733,456 A | 3/1998 | Okey et al. | 6,440,303 B2 | 8/2002 | Spriegel |
| 5,744,037 A | 4/1998 | Fujimura et al. | D462,699 S | 9/2002 | Johnson et al. |
| 5,747,605 A | 5/1998 | Breant et al. | 6,444,124 B1 | 9/2002 | Onyeche et al. |
| 5,766,479 A | 6/1998 | Collentro et al. | 6,468,430 B1 | 10/2002 | Kimura et al. |
| 5,783,083 A | 7/1998 | Henshaw et al. | 6,485,645 B1 | 11/2002 | Husain et al. |
| 5,843,069 A | 12/1998 | Butler et al. | 6,495,041 B2 | 12/2002 | Taniguchi et al. |
| 5,846,424 A | 12/1998 | Khudenko | 6,524,481 B2 | 2/2003 | Zha et al. |
| 5,888,401 A | 3/1999 | Nguyen | 6,524,733 B1 | 2/2003 | Nonobe |
| 5,895,570 A | 4/1999 | Liang | 6,550,747 B1 | 4/2003 | Rabie et al. |
| 5,906,739 A | 5/1999 | Osterland et al. | 6,555,005 B1 | 4/2003 | Zha et al. |
| 5,906,742 A | 5/1999 | Wang et al. | 6,576,136 B1 | 6/2003 | De Moel et al. |
| 5,910,250 A | 6/1999 | Mahendran et al. | D478,913 S | 8/2003 | Johnson et al. |
| 5,914,039 A | 6/1999 | Mahendran et al. | 6,620,319 B2 | 9/2003 | Behmann et al. |
| 5,918,264 A | 6/1999 | Drummond et al. | 6,627,082 B2 | 9/2003 | Del Vecchio |
| 5,942,113 A | 8/1999 | Morimura | 6,635,179 B1 | 10/2003 | Summerton et al. |
| 5,944,997 A | 8/1999 | Pedersen et al. | 6,641,733 B2 | 11/2003 | Zha et al. |
| 5,951,878 A | 9/1999 | Astrom | 6,645,374 B2 | 11/2003 | Cote et al. |

| | | |
|---|---|---|
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,189 B2 | 3/2004 | Rabie et al. |
| 6,708,957 B2 | 3/2004 | Cote et al. |
| 6,721,529 B2 | 4/2004 | Chen et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,758,972 B2 | 7/2004 | Vriens et al. |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,912 B2 | 9/2004 | Blong |
| 6,805,806 B2 | 10/2004 | Arnaud |
| 6,811,696 B2 | 11/2004 | Wang et al. |
| 6,814,861 B2 | 11/2004 | Husain et al. |
| 6,821,420 B2 | 11/2004 | Zha et al. |
| 6,841,070 B2 | 1/2005 | Zha et al. |
| 6,861,466 B2 | 3/2005 | Dadalas et al. |
| 6,863,817 B2 | 3/2005 | Liu et al. |
| 6,863,823 B2 | 3/2005 | Côté |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowel |
| 7,018,530 B2 | 3/2006 | Pollock |
| 7,018,533 B2 | 3/2006 | Johnson et al. |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,172,701 B2 | 2/2007 | Gaid et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,300,022 B2 | 11/2007 | Muller |
| 2002/0070157 A1 | 6/2002 | Yamada |
| 2002/0148767 A1 | 10/2002 | Johnson et al. |
| 2003/0038080 A1 | 2/2003 | Vriens et al. |
| 2003/0057155 A1 | 3/2003 | Husain et al. |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0178365 A1 | 9/2003 | Zha et al. |
| 2003/0226797 A1 | 12/2003 | Phelps |
| 2004/0007525 A1 | 1/2004 | Rabie et al. |
| 2004/0035770 A1 | 2/2004 | Edwards et al. |
| 2004/0084369 A1 | 5/2004 | Zha et al. |
| 2004/0145076 A1 | 7/2004 | Zha et al. |
| 2004/0168979 A1 | 9/2004 | Zha et al. |
| 2004/0178154 A1 | 9/2004 | Zha et al. |
| 2004/0217053 A1 | 11/2004 | Zha et al. |
| 2004/0232076 A1 | 11/2004 | Zha et al. |
| 2005/0029185 A1 | 2/2005 | Muller |
| 2005/0029186 A1 | 2/2005 | Muller |
| 2005/0032982 A1 | 2/2005 | Muller et al. |
| 2005/0103722 A1 | 5/2005 | Freydina et al. |
| 2005/0115880 A1 | 6/2005 | Pollock |
| 2005/0115899 A1 | 6/2005 | Liu et al. |
| 2005/0139538 A1 | 6/2005 | Lazaredes |
| 2005/0194310 A1 | 9/2005 | Yamamoto et al. |
| 2005/0194315 A1 | 9/2005 | Adams et al. |
| 2006/0000775 A1 | 1/2006 | Zha et al. |
| 2006/0081533 A1* | 4/2006 | Khudenko .......... 210/607 |
| 2006/0131234 A1 | 6/2006 | Zha et al. |
| 2006/0201876 A1 | 9/2006 | Jordan |
| 2006/0261007 A1 | 11/2006 | Zha et al. |
| 2006/0273007 A1* | 12/2006 | Zha et al. .............. 210/636 |
| 2006/0273038 A1 | 12/2006 | Syed et al. |
| 2007/0007214 A1 | 1/2007 | Zha et al. |
| 2007/0056905 A1 | 3/2007 | Beck et al. |
| 2007/0075021 A1 | 4/2007 | Johnson |
| 2007/0108125 A1 | 5/2007 | Cho et al. |
| 2007/0227973 A1 | 10/2007 | Zha et al. |

FOREIGN PATENT DOCUMENTS

| | | |
|---|---|---|
| AU | 55847/86 | 3/1985 |
| AU | 77066/87 | 7/1986 |
| CN | 1050770 C | 1/1995 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 29804927 U1 | 6/1998 |
| DE | 29906389 | 6/1999 |
| EP | 012557 B1 | 2/1983 |
| EP | 126714 A2 | 11/1984 |
| EP | 050447 B1 | 10/1985 |
| EP | 250337 A1 | 12/1987 |
| EP | 327025 A1 | 8/1989 |
| EP | 090383 B1 | 5/1990 |
| EP | 407900 A2 | 1/1991 |
| EP | 463627 A2 | 1/1992 |
| EP | 492942 A2 | 7/1992 |
| EP | 518250 B1 | 12/1992 |
| EP | 547575 A1 | 6/1993 |
| EP | 395133 B1 | 2/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 1034835 A1 | 9/2000 |
| EP | 1052012 A1 | 11/2000 |
| EP | 1349644 | 10/2003 |
| EP | 1350555 A1 | 10/2003 |
| EP | 1236503 B1 | 8/2004 |
| FR | 2620712 | 3/1989 |
| FR | 2674448 | 10/1992 |
| FR | 2699424 | 6/1994 |
| GB | 702911 | 1/1954 |
| GB | 2253572 A | 9/1992 |
| JP | 54-162684 | 12/1979 |
| JP | 55-129155 | 6/1980 |
| JP | 55-099703 | 7/1980 |
| JP | 55-129107 | 10/1980 |
| JP | 56-021604 | 2/1981 |
| JP | 56-118701 | 9/1981 |
| JP | 56-121685 | 9/1981 |
| JP | 58-088007 | 5/1983 |
| JP | 60-019002 | 1/1985 |

| | | |
|---|---|---|
| JP | 60-206412 | 10/1985 |
| JP | 61-097005 | 5/1986 |
| JP | 61-097006 | 5/1986 |
| JP | 61-107905 | 5/1986 |
| JP | 61-167406 | 7/1986 |
| JP | 61-167407 | 7/1986 |
| JP | 61-171504 | 8/1986 |
| JP | 61-192309 | 8/1986 |
| JP | 61-222510 | 10/1986 |
| JP | 61-242607 | 10/1986 |
| JP | 61-249505 | 11/1986 |
| JP | 61-257203 | 11/1986 |
| JP | 61-263605 | 11/1986 |
| JP | 61-291007 | 12/1986 |
| JP | 61-293504 | 12/1986 |
| JP | 62-004408 | 1/1987 |
| JP | 62-114609 | 5/1987 |
| JP | 62-140607 | 6/1987 |
| JP | 62-144708 | 6/1987 |
| JP | 62-163708 | 7/1987 |
| JP | 62-179540 | 8/1987 |
| JP | 62-250908 | 10/1987 |
| JP | 63-097634 | 4/1988 |
| JP | 63-143905 | 6/1988 |
| JP | 63-171607 | 7/1988 |
| JP | 63-180254 | 7/1988 |
| JP | S63-38884 | 10/1988 |
| JP | 01-151906 | 6/1989 |
| JP | 01-307409 | 12/1989 |
| JP | 02-026625 | 1/1990 |
| JP | 02-031200 | 2/1990 |
| JP | 02-107318 | 4/1990 |
| JP | 02-126922 | 5/1990 |
| JP | 02-144132 | 6/1990 |
| JP | 02-164423 | 6/1990 |
| JP | 02-277528 | 11/1990 |
| JP | 02-284035 | 11/1990 |
| JP | 03-018373 | 1/1991 |
| JP | 03-028797 | 2/1991 |
| JP | 03-110445 | 5/1991 |
| JP | 04-187224 | 7/1992 |
| JP | 04-250898 | 9/1992 |
| JP | 04-256424 | 9/1992 |
| JP | 04-265128 | 9/1992 |
| JP | 04-293527 | 10/1992 |
| JP | 04-310223 | 11/1992 |
| JP | 04-348252 | 12/1992 |
| JP | 05-023557 | 2/1993 |
| JP | 05-096136 | 4/1993 |
| JP | 05-137977 | 6/1993 |
| JP | 05-157654 | 6/1993 |
| JP | 05-285348 | 11/1993 |
| JP | 06-071120 | 3/1994 |
| JP | 06-114240 | 4/1994 |
| JP | 06-218237 | 8/1994 |
| JP | 06-277469 | 10/1994 |
| JP | 06-285496 | 10/1994 |
| JP | 06-343837 | 12/1994 |
| JP | 07-000770 | 1/1995 |
| JP | 07-024272 | 1/1995 |
| JP | 07-068139 | 3/1995 |
| JP | 07-136470 | 5/1995 |
| JP | 07-136471 | 5/1995 |
| JP | 07-155758 | 6/1995 |
| JP | 07-178323 | 7/1995 |
| JP | 07-185268 | 7/1995 |
| JP | 07-185271 | 7/1995 |
| JP | 07-236819 | 9/1995 |
| JP | 07-251043 | 10/1995 |
| JP | 07-275665 | 10/1995 |
| JP | 07-289860 | 11/1995 |
| JP | 07-303895 | 11/1995 |
| JP | 08-010585 | 1/1996 |
| JP | 09-099227 | 4/1997 |
| JP | 09-141063 | 6/1997 |
| JP | 09-187628 | 7/1997 |
| JP | 09-220569 | 8/1997 |
| JP | 09-271641 | 10/1997 |
| JP | 09-324067 | 12/1997 |
| JP | 10-033955 | 2/1998 |
| JP | 10-048466 | 2/1998 |
| JP | 10-085565 | 4/1998 |
| JP | 10-156149 | 6/1998 |
| JP | 11-028467 | 2/1999 |
| JP | 11-156166 | 6/1999 |
| JP | 11-165200 | 6/1999 |
| JP | 11-333265 | 7/1999 |
| JP | 11-033365 | 9/1999 |
| JP | 11-319507 | 11/1999 |
| JP | 2000-070684 | 3/2000 |
| JP | 2000-185220 | 4/2000 |
| JP | 2000-157850 | 6/2000 |
| JP | 2000-317276 | 11/2000 |
| JP | 2001-009246 | 1/2001 |
| JP | 2001-070967 | 3/2001 |
| JP | 2001-079367 | 3/2001 |
| JP | 2001-104760 | 4/2001 |
| JP | 2001-190937 | 7/2001 |
| JP | 2001-190938 | 7/2001 |
| JP | 2001-205055 | 7/2001 |
| JP | 2000-342932 | 12/2002 |
| JP | 2003-047830 | 2/2003 |
| JP | 2003-062436 | 3/2003 |
| JP | 2003-135935 | 5/2003 |
| KR | 2002-0090967 | 12/2002 |
| NL | 1020491 C | 10/2003 |
| NL | 1021197 C | 10/2003 |
| TW | 347343 | 12/1998 |
| WO | WO 88-06200 | 8/1988 |
| WO | WO 89-00880 | 2/1989 |
| WO | WO 90-00434 | 1/1990 |
| WO | WO 91-04783 | 4/1991 |
| WO | WO 91-16124 | 10/1991 |
| WO | WO 93-02779 | 2/1993 |
| WO | WO 93-15827 | 8/1993 |
| WO | WO 93-23152 | 11/1993 |
| WO | WO 94-11094 | 5/1994 |
| WO | WO 95-34424 | 12/1995 |
| WO | WO 96-07470 A1 | 3/1996 |
| WO | WO 96-28236 | 9/1996 |
| WO | WO 96-41676 | 12/1996 |
| WO | WO 97-06880 | 2/1997 |
| WO | WO 98-22204 | 5/1998 |
| WO | WO 98-25694 | 6/1998 |
| WO | WO 98-28066 | 7/1998 |
| WO | WO 98-53902 | 12/1998 |
| WO | WO 99-01207 | 1/1999 |
| WO | WO 99-59707 | 11/1999 |
| WO | WO 00-18498 | 4/2000 |
| WO | WO 00-30742 | 6/2000 |
| WO | WO 01-00307 | 1/2001 |
| WO | WO 01-32299 | 5/2001 |
| WO | WO 01-36075 | 5/2001 |
| WO | WO 01-45829 A1 | 6/2001 |
| WO | WO 02-40140 A1 | 5/2002 |
| WO | WO 03-000389 A2 | 1/2003 |
| WO | WO 03-013706 A1 | 2/2003 |
| WO | WO 2004-101120 A1 | 11/2004 |
| WO | WO 2005-021140 A1 | 3/2005 |
| WO | WO 2005-037414 A1 | 4/2005 |
| WO | WO 2005-077499 A1 | 8/2005 |

| | | | |
|---|---|---|---|
| WO | WO 2006-029456 A1 | 3/2006 | |

OTHER PUBLICATIONS

Anonymous, "*Nonwoven Constructions of Dyneon™ THV Dyneon™ THE Fluorothermoplastics*", Research Disclosure Journal, Apr. 1999, RD 420013, 2 pages.

Cote et al., *Wat. Sci. Tech.* 38(4-5) (1998), pp. 437-442.

Cote, et al. "A New Immersed Membrane for Pretreatment to Reverse Osmosis" Desalination 139 (2001) 229-236.

Crawford et al., "Procurement of Membrane Equipment: Differences Between Water Treatment and Membrane Bioreactor (MBR) Applications" (2003).

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2$^{nd}$ Intl. Meeting; School of Water Sciences, Cranfield University, Cranfield, UK, Jun. 1999.

Johnson, "Recent Advances in Microfiltration for Drinking Water Treatment," AWWA Annual Conference, Jun. 20-24, 1999, Chicago, Illinois, entire publication.

Recent Advances in Microfiltration for Drinking Water Treatment; An Introduction to CMF-S, Presentation.

Kaiya et al., "Water Purification Using Hollow Fiber Microfiltration Membranes," 6th World Filtration Congress, Nagoya, 1993, pp. 813-816.

Lloyd D.R. et al. "Microporous Membrane Formation Via Thermally Induced Phase Separation-Solid-Liquid Phase Separation" *Journal of Membrane Science*, (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

MicroC™ -Carbon Source for Wastewater Denitrification. Information from Environmental Operating Solutions website including MSDS.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", *Journal of Membrane Science*, (Dec. 1, 2002), pp. 175-180, vol. 210 No. 1, Scientific Publishing Company, Amsterdam, NL.

Rosenberger et al., Desalination, 151 (2002), pp. 195-200.

Ueda et al., "Effects of Aeration on Suction Pressure in a Submerged Membrane Bioreactor," Wat. Res. vol. 31, No. 3, 1997, pp. 489-494.

*Water Encyclopedia*, edited by Jay Lehr, published by John Wiley & Sons, Inc., Hoboken, New Jersey, 2005. Available at http://wwwmrw.interscience.wiley.com/eow/.

White et al., *The Chemical Engineering Journal*, 52 (1993), pp. 73-77.

Wikipedia, "Seawater," available at http://en.wikipedia.org/wiki/Seawater, Jul. 15, 2007.

Zenon, "Proposal for ZeeWeed® Membrane Filtration Equipment System for the City of Westminster, Colorado, Proposal No. 479-99," Mar. 2000, entire publication.

* cited by examiner

SYSTEM FOR TREATING WASTEWATER

RELATED APPLICATIONS

This application claims priority under 35 U.S.C. § 119(e) to U.S. Provisional Application Ser. No. 60/723,745, entitled "METHOD AND APPARATUS FOR TREATING WASTEWATER," filed on Oct. 5, 2005, which is herein incorporated by reference in its entirety.

BACKGROUND OF INVENTION

1. Field of Invention

The present invention relates to a system and method for treating wastewater, and more particularly to a wastewater treatment system and method utilizing a membrane bioreactor.

2. Discussion of Related Art

The importance of membranes for treatment of waste water is growing rapidly. With the arrival of submerged membrane processes where the membrane modules are immersed in a large feed tank and filtrate is collected typically through suction applied to the filtrate side of the membrane, membrane bioreactors (MBRs) combining biological and physical processes in one stage promise to be more compact, efficient and economic. Membrane bioreactors are typically sized to accommodate community and large-scale sewage treatment, i.e. 160,000 gpd, and 20-40 mgd and more. However, construction and energy use costs associated with large scale MBR systems are significant.

SUMMARY OF INVENTION

In accordance with one or more embodiments, the invention relates to a system and method of treating wastewater.

In one embodiment, a wastewater treatment system includes a bioreactor comprising a first compartment and a second compartment, means for periodically aerating at least one of the first compartment and the second compartment, and a membrane bioreactor fluidly connected to at least one of an outlet of the first compartment and an outlet of the second compartment. In another embodiment, the means for aerating at least one compartment comprises a jet assembly positioned in each compartment.

Another embodiment is directed to a method or treating wastewater comprising providing a wastewater to one of a first compartment, a second compartment, and combinations thereof, alternating between anoxic conditions and aerobic conditions within the same compartment, and passing the wastewater from the at least one of the first compartment and the second compartment to a membrane bioreactor.

Another embodiment is directed to a computer-readable medium having computer-readable signals stored thereon that define instruction that, as a result of being executed by a computer, instruct the computer to perform a method of controlling a wastewater treatment system comprising actor of receiving an input signal respective of a characteristic of wastewater in a first compartment of a bioreactor and regulating an amount of air directed to the first compartment.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
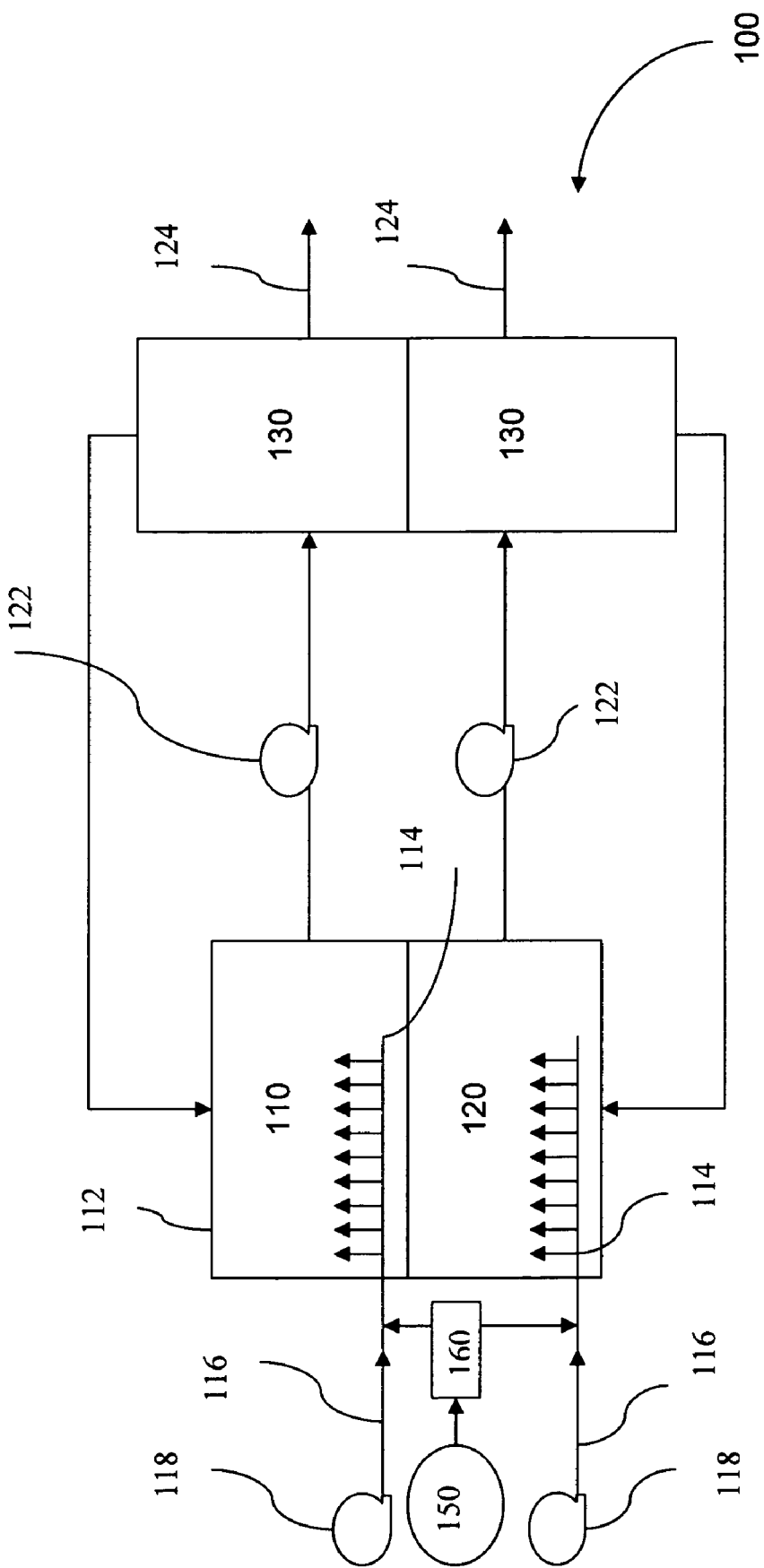
FIG. 1 is a schematic diagram in accordance with one or more embodiments of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. Only the transitional phrases "consisting of" and "consisting essentially of" are closed or semi-closed transitional phrases, respectively, with respect to the claims. As used herein, the term "plurality" refers to two or more items or components.

The invention is directed to wastewater treatment systems utilizing membrane bioreactors (MBR's). "Wastewater," as used herein, defines a stream of waste from a residential or community source, having pollutants of biodegradable material, inorganic or organic compounds capable of being decomposed by bacteria, flowing into the wastewater treatment system. As used herein, a "wastewater treatment system" is a system, typically a biological treatment system, having a biomass population of bacterial micro-organisms of a diversity of types of bacteria, used to digest biodegradable material. Notably, the biomass requires an environment that provides the proper conditions for growth.

One embodiment of the present invention includes a plurality of biological basins operated simultaneously. The plurality of biological basins may comprise individual basins positioned near or adjacent to one another, or a single basin with a plurality of compartments. As used herein, the terms "basin" and "compartment" are used interchangeably to denote an individual treatment zone. In one embodiment, at least two basins are positioned adjacent one another and share a common interior wall which may reduce construction costs.

According to one embodiment, a suspension system may be disposed in each of the plurality of basins. The suspension system may be any system sufficient to suspend solids in the wastewater within the basin. For example, the suspension system may be a stirrer or a plurality of fluid jet streams. In one embodiment, the suspension system includes a plurality of jets positioned at or near a floor of each basin for delivering a jet stream of fluid and/or air.

In one embodiment, an aeration system is disposed in each of the plurality of basins. The aeration system may be any aeration system sufficient to deliver a suitable amount of air to promote aerobic conditions within the basin. The aeration system my produce fine bubbles, coarse bubbles, a jet stream of gas, and combinations thereof. The aeration system may be positioned in any suitable location within the compartment. In one embodiment, the aeration system is fluidly connected to the jet suspension system, that is to say, the aeration system and the fluidization system may be combined into one system.

In one embodiment, when it is desirable to aerate one or more basins, air may be added to the wastewater in the fluidization system for delivery through a jet assembly. In one embodiment, a single source of air may be used to supply one or more aerations systems. For example, a single air blower may cycle air between and among multiple basins through switchover devices, such as diversion valves. The use of a single source of air to cycle aeration between two or more basins may reduce original equipment costs, which typically include an individual source of air for each basin.

In one embodiment, a common wastewater feed is fluidly connected to each jet suspension system in multiple basins. The jet suspension system operates continually in each basin fluidizing each basin. Air may then be cycled among the basins through the jet suspension system. When aeration of one or more basins is desired, air may diverted to one or more particular jet suspension systems of a particular basin or basins. When anoxic conditions are desired, a flow of air may be completely interrupted and air may be diverted away from the particular basin or basins. It is appreciated that the flow of air need not be completely interrupted when operating under anoxic conditions. For example, a minimum amount of air may be desired to assist in the anoxic process, so long as the air present under anoxic conditions is not sufficient to support aerobic conditions in the basin.

In one embodiment, a single blower may be used to cycle air among respective basins, wherein at any give time, one or more basins may run under aerobic conditions, while the remaining basin or basins may run under anoxic conditions. One advantage of the combined suspension/aeration system may a reduced incidence of clogging by settling solids as fluid (either wastewater or combined wastewater and air) is always passing through the combined suspension/aeration system.

The combined suspension/aeration system may have any configuration to provide adequate suspension and aeration for the desired application and treatment volume. For example, the combined system may comprise a jet assembly having a high efficiency jet having an orifice of a particular configuration and cross sectional area to promote suspension and aeration.

Switchover of air flow form one or more basins to another or multiple other basins may by manual or automatic, based upon time of operating conditions within the basins, sensors detecting a characteristic of the wastewater within the basins, or combinations thereof. For example, one or more sensors may detect dissolved oxygen content, oxidation reduction potential (ORP), alkalinity, and/or nitrate content of wastewater within a basin, thereby generating a signal indicating operating conditions are appropriate for either adding air or interrupting air flowing to a particular basin. In one embodiment, alternating between anoxic and aerobic conditions is based upon a duration of a particular cycle and a concentration of dissolved oxygen in the basin. In another embodiment, a decrease in the rate of change of the oxidation reduction potential may signal the end of the anoxic cycle.

Cycling between anoxic and aerobic conditions within the same basin may provide advantages over batch or sequential batch operations which require transfer of basin contents from one basin to another. For example, one advantage of cycling air among basins is that the contents of the basins need not be transferred to another basin in order to switch between anoxic and aerobic conditions, thereby reducing the number of basins required. The continuous operation of a single blower to supply at least two basins may also reduce energy costs.

One or more of the basins may be operated as a batch flow mode, a sequencing batch reactor, or as a continuous flow batch reactor having continuous wastewater inflow. In a continuous flow batch reactor, the wastewater may be directed to one or more basins equally, or directed to a particular basin based upon volume of flow or one or more physical or chemical characteristics of the wastewater. For example, the chemical makeup of incoming wastewater may determine whether the incoming wastewater is to be directed to a basin currently operating under anoxic conditions, or to a basin currently operating under aerobic conditions.

Because each basin cycles between anoxic and aerobic conditions, the residence time of wastewater within each basin determines the number of anoxic cycles and aerobic cycles to which the wastewater is exposed. For example, wastewater entering a basin may be exposed to only one anoxic cycle and one aerobic cycle. However, under a longer residence time, wastewater entering a basin may be exposed to multiple anoxic and aerobic cycles.

The bacteria used in the basins may be any bacteria suitable to thrive in anoxic and/or anaerobic conditions. In one embodiment, the anoxic process may form facultative bacteria that may work in both anoxic and aerobic conditions.

In another embodiment, the effluent from one or more of the basins may be directed to one or more membrane basins, each membrane basin having one or more filter membranes positioned therein. The one or more membrane basins may be formed similar to the biological basins. For example, if multiple membrane basins are desired, the membrane basins may comprise individual basins positioned near or adjacent to one another, or a single basin with a plurality of compartments, sharing at least one interior wall. In one embodiment, the one or more biological basins are fluidly connected to one membrane basin. In another embodiment, at least two basins are fluidly connected to at least two membrane basins.

The filter membranes may have any configuration suitable for a particular purpose, such as sheet or hollow tube. The membrane may be formed of any material (natural or synthetic) suitable for a particular filtration. In one embodiment, the membrane is formed of polymeric hollow fibers. The one or more filter membranes may be positioned in one or more membrane modules. The membrane modules may have any shape and cross sectional area suitable for use in a desired application, for example, square, rectangular, or cylindrical. In one embodiment, the membrane modules are cylindrical.

According to one embodiment of the invention, one or more membrane modules may be positioned in a basin in such a way as to be completely submerged by fluid during operation. For example, the membrane module may be positioned horizontally, vertically, or at an angle within the basin. Multiple membrane modules may be positioned adjacent one another, or located at predetermined positions within the basin and may, but need not, be positioned in the same plane as others or parallel to one another. The membrane modules may be mounted directly to the basin or mounted to a module support which may be removably attached to the basin. In one embodiment, a plurality of membrane modules are mounted to a module support to facilitate membrane maintenance and/or replacement.

As exemplarily illustrated in FIG. 1, some treatment systems 100 of the invention may comprise a biological basin 112 comprising two compartments 110, 120. Jet assembly systems 114 are fluidly connected to wastewater inlets 116 and aeration blower 150. Jet pumps 118 operate continuously to introduce wastewater into compartments 110, 120 as well as to suspend solids present in the wastewater. Aeration blower 150 also operates continuously providing a source of air that is cycled between the jet assembly 114 in compartment 110 and the jet assembly 114 in compartment 120. A switchover device 160 directs the flow of air between the two jet assemblies. Compartment 110 is fluidly connected to a first membrane basin 130. Compartment 120 is fluidly connected to a second membrane basin 130. Pumps 122 direct treated wastewater from each compartment 110, 120 to membrane basins 130, and assist in recycling mixed liquor from the first and second membrane basins 130 to compartment 110 and compartment 120, respectively. Filtrate exits membrane basins 130 through lines 124.

During operation, switchover device 160 diverts air to compartment 110 and interrupts air flow to compartment 120 so that compartment 110 operates under aerobic conditions and compartment 120 operates under anoxic conditions. Switchover device 160 may then interrupt air to the jet assembly 114 in compartment 110, and direct air to the jet assembly 114 in compartment 120, at which time conditions in compartment 110 change from aerobic to anoxic, and conditions in compartment 120 change from anoxic to aerobic.

Figure 2:
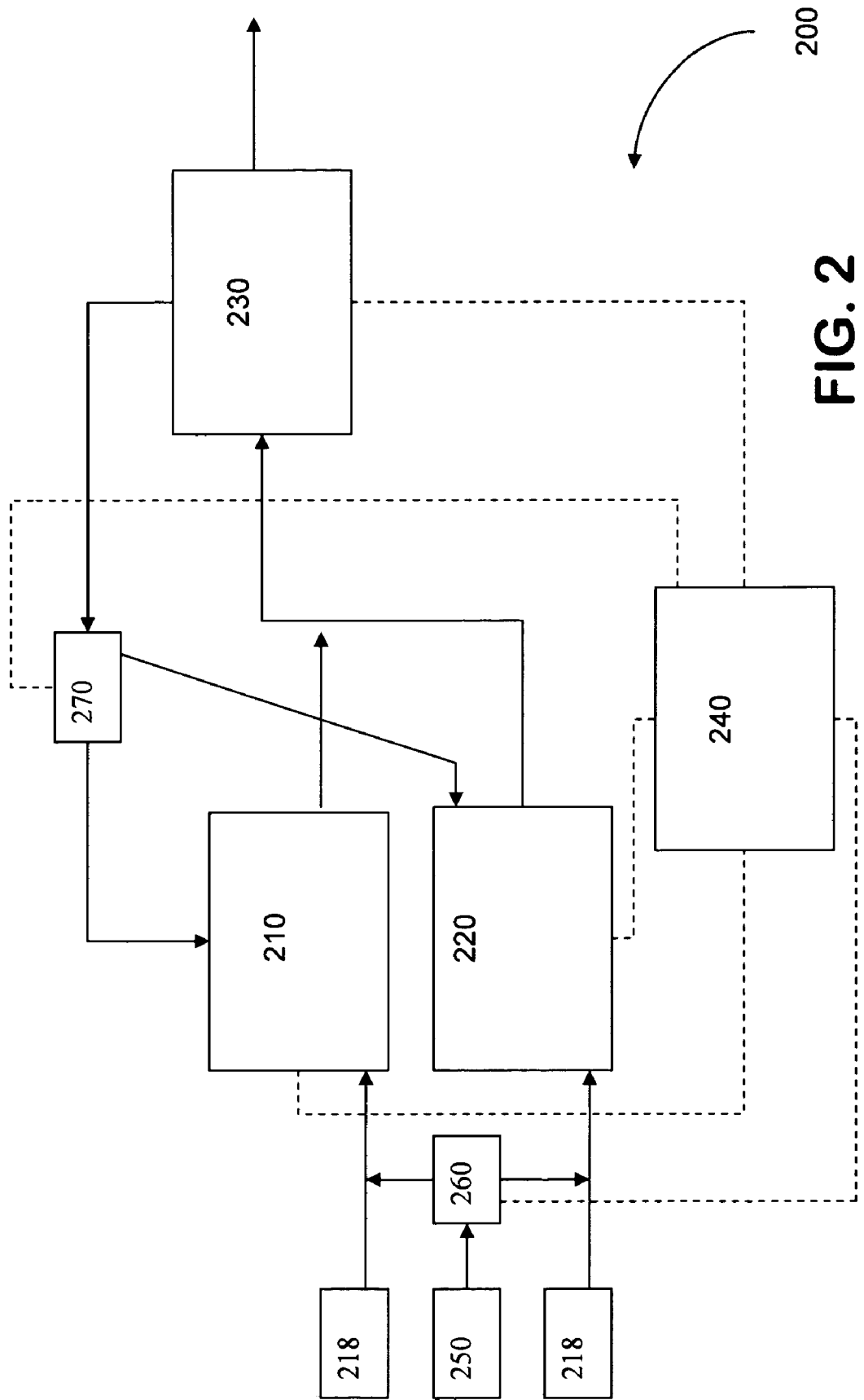
FIG. 2 is a block diagram illustrating a treatment system in accordance with one or more embodiments of the invention.

Some aspects of the invention may be particularly directed to controlling waste treatment operations that utilize membrane filtration techniques. For example, with reference to FIG. 2, a wastewater treatment system 200 may comprise a first biological compartment 210, a second biological compartment 220 and a membrane compartment 230. Facultative bacteria, which functions in both anoxic and aerobic conditions, may be positioned in both compartments 210, 220. Wastewater enters compartments 210, 220 from wastewater source 218, such as jet pumps. A source of air 250, such as a blower, delivers air to one or both compartments 210, 220 through switchover device 260. Concentrated mixed liquor may be directed from membrane compartment 230 to one or both of compartments 210, 220 via switchover device 270.

Controller 240 may respond to signals from sensors (not shown) positioned at any particular location within the system. For example, a sensor in compartment 210, which may be operating under anoxic conditions, may generate a signal indicating that denitrification has reached a desired extent of completion. Controller 240 may respond by generating a control signal causing switchover device 260 to direct air to compartment 210. Similarly, a sensor (not shown) in compartment 220, which may be operating under aerobic conditions, may generate a signal indicating that oxidation has reached a desired extent of completion. Controller 240 may respond by generating a control signal causing switchover device 260 to interrupt flow of air to compartment 220.

Controller 240 may also respond to one or more sensors positioned in membrane compartment 230. For example, a sensor in membrane compartment 230 may generate a signal indicating the concentrated mixed liquor being recycled from membrane compartment 230 should be further exposed to anoxic conditions. Controller 240 may respond by generating a control signal to switchover device 270 to direct recycled concentrated mixed liquor to either or both compartments 210, 220 which may be operating under anoxic conditions. Similarly, controller 240 may respond to one or more sensors (not shown) positioned in a wastewater inlet to generate a signal to a flow controller (not shown) to direct incoming wastewater to one or both compartments 210, 220.

The system and controller of one or more embodiments of the invention provide a versatile unit having multiple modes of operation, which can respond to multiple inputs to increase the efficiency of the wastewater treatment system.

Figure 3:
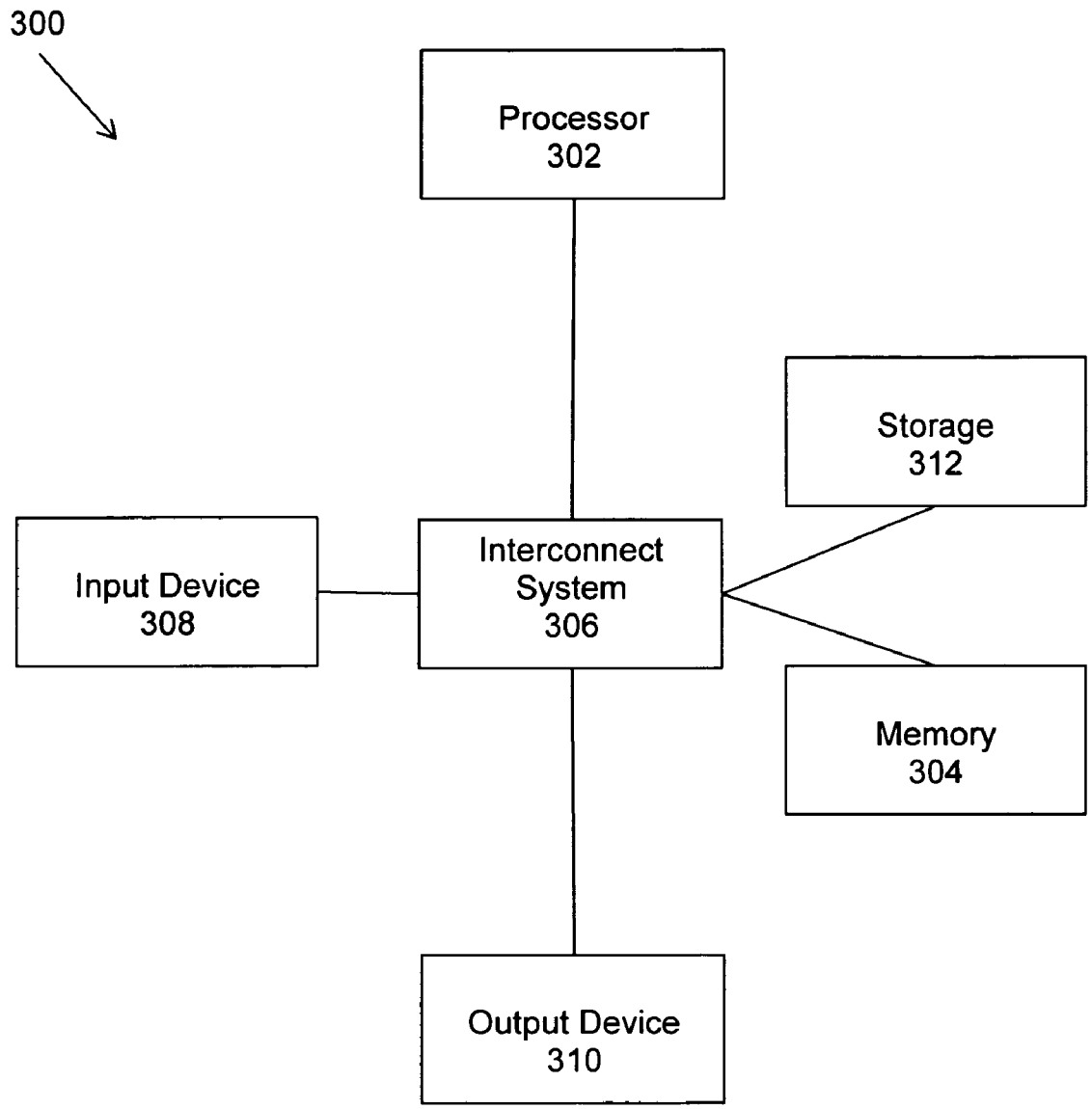
FIG. 3 is a schematic diagram illustrating a computer system upon which one or more embodiments of the invention may be practiced.

The controller of the system of the invention 240 may be implemented using one or more computer systems 300 as exemplarily shown in FIG. 3. Computer system 300 may be, for example, a general-purpose computer such as those based on in Intel PENTIUM®-type processor, a Motorol PowerPC® processor, a Hewlett-Packard PA-RISC® processor, a Sun UltraAPARC® processor, or any other type of processor or combination thereof. Alternatively, the computer system may include specially-programmed, special-purpose hardware, for example, an application-specific integrated circuit (ASIC) or controllers intended for water treatment systems.

Computer system 300 can include one or more processors 302 typically connected to one or more memory devices 304, which can comprise, for example, any one or more of a disk drive memory, a flash memory device, a RAM memory device, or other device for storing data. Memory 304 is typically used for storing programs and data during operation of the system 200 and/or computer system 300. For example, memory 304 may be used for storing historical data relating to the parameters over a period of time, as well as operating data. Software, including programming code that implements embodiments of the invention, can be stored on a computer readable and/or writeable nonvolatile recording medium (discussed further with respect to FIG. 4), and then typically copied into memory 304 wherein it can then be executed by processor 302. Such programming code may be written in any of a plurality of programming languages, for example, Java, Visual Basic, C, C#, or C++, Fortran, Pascal, Eiffel, Basic, COBAL, or any of a variety of combinations thereof.

Components of computer system 300 may be coupled by one or more interconnection mechanisms 306, which may include one or more busses (e.g., between components that are integrated within a same device) and/or a network (e.g., between components that reside on separate discrete devices). The interconnection mechanism typically enables communications (e.g., data, instructions) to be exchanged between components of system 300.

Computer system 300 can also include one or more input devices 308, for example, a keyboard, mouse, trackball, microphone, touch screen, and other man-machine interface devices as well as one or more output devices 310, for example, a printing device, display screen, or speaker. In addition, computer system 300 may contain one or more interfaces (not shown) that can connect computer system 300 to a communication network (in addition or as an alternative to the network that may be formed by one or more of the components of system 300).

According to one or more embodiments of the invention, the one or more input devices 308 may include sensors for measuring parameters of system 200 and/or components thereof. Alternatively, the sensors, the metering valves and/or pumps, or all of these components may be connected to a communication network (not shown) that is operatively coupled to computer system 300. For example, one or more compartments 210, 220, and 230, and/or components thereof, may be configured as input devices that are connected to computer system 300. Any one or more of the above may be coupled to another computer system or component to communicate with computer system 300 over one or more communication networks. Such a configuration permits any sensor or signal-generating device to be located at a significant distance from the computer system and/or allow any sensor to be located at a significant distance from any subsystem and/or the controller, while still providing data therebetween. Such communication mechanisms may be effected by utilizing any suitable technique including but not limited to those utilizing wireless protocols.

Figure 4:
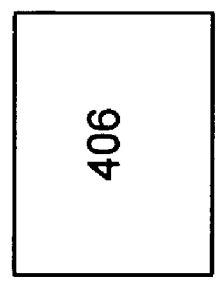
FIG. 4 is a schematic illustration of a storage system that may be used with the computer system of FIG. 3 in accordance with one or more embodiment so the invention.
Figure 4:
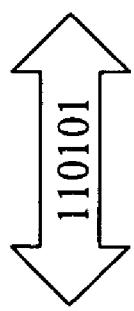
Figure 4:
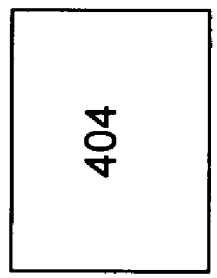
Figure 4:
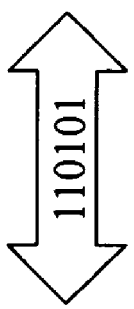
Figure 4:
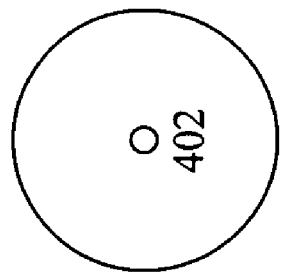

As exemplarily shown in FIG. 4, controller 300 can include one or more computer storage media such as readable and/or writeable nonvolatile recording medium 402 in which signals can be stored that define a program to be executed by one or more processors 302. Medium 402 may, for example, be a disk or flash memory. In typical operation, processor 302 can cause data, such as code that implements one or more embodiments of the invention, to be read from storage medium 402 into a memory 404 that allows for faster access to the information by the one or more processors than does medium 402. Memory 404 is typically a volatile, random access memory such as a dynamic random access memory (DRAM) or static memory (SRAM) or other suitable devices that facilitates information transfer to and from processor 302.

Although computer system 300 is shown by way of example as one type of computer system upon which various aspects of the invention may be practiced, it should be appreciated that the invention is not limited to being implemented in software, or on the computer system as exemplarily shown. Indeed, rather than implemented on, for example, a general purpose computer system, the controller, or components or subsections thereof, may alternatively be implemented as a dedicated system or as a dedicated programmable logic controller (PLC) or in a distributed control system. Further, it should be appreciated that one or more features or aspects of the invention may be implemented in software, hardware or firmware, or any combination thereof. For example, one or more segments of an algorithm executable by controller 240 can be performed in separate computers, which in turn, can be communication through one or more networks.

Having thus described several aspects of at least one embodiment of this invention, it should be apparent to those skilled in the art that the foregoing is merely illustrative and not limiting, having been presented by way of example only. Numerous modification and other embodiments are within the scope of the invention. In particular, although many embodiments presented herein involve specific combinations of method acts or system elements, it should be understood that those acts and those elements may be combined in other ways to accomplish the same objectives.

Further, acts, elements, and features discusses only in connection with one embodiment are not intended to be excluded from a similar role in other embodiments.

It is to be appreciated that various alterations, modifications, and improvements can readily occur to those skilled in the art ant that such alterations, modifications, and improvements are intended to be part of the disclosure and within the spirit and scope of the invention.

Moreover, it should also be appreciated that the invention is directed to each feature, system, subsystem, or technique described herein and any combination of two or more features, systems, subsystems, and/or method, if such features, systems, subsystems, and techniques are not mutually inconsistent, is considered to be within the scope of the invention as embodied in the claims.

Use of ordinal terms such as "first," "second," "third," and the like in the claims to modify a claim element does not by itself connote any priority, precedence, or order of one claimed element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configuration described herein are exemplary and that actual parameters and/or configurations will depend on the specific application in which the systems and techniques of the invention are used. Those skilled in the art should also recognize or be able to ascertain, using no more than routing experimentation, equivalents to the specific embodiments of the invention. It is therefore to be understood that the embodiments described herein are presented by way of example only and that, within the scope of the appended claims and equivalents thereto; the invention my be practice otherwise than as specifically described.

What is claimed is:

1. A wastewater treatment system comprising:
   a bioreactor comprising:
      a first jet assembly positioned in a first compartment; and
      a second jet assembly positioned in a second compartment;
   a source of wastewater fluidly connected to an inlet of the first jet assembly and to an inlet of the second jet assembly;
   a source of air fluidly connected to the inlet of the first jet assembly and to the inlet of the second jet assembly;
   a switchover device fluidly connected downstream of the source of air and upstream of the inlet of the first jet assembly and the inlet of the second jet assembly, the switchover device constructed and arranged to direct air to one of the first and second jet assemblies while interrupting a flow of air to the other of the first and second jet assemblies; and
   a first membrane compartment fluidly connected to at least one of an outlet of the first compartment and an outlet of the second compartment.

2. The wastewater treatment system of claim 1, further comprising:
   a controller in communication with the switchover device; the controller configured to generate a first control signal that adjusts a flow rate of air to the first jet assembly, and a second control signal that adjusts a flow rate of air to the second jet assembly.

3. The wastewater treatment system of claim 2, further comprising:
   a first sensor positioned in the first compartment; and
   a second sensor positioned in the second compartment, wherein the controller is responsive to a signal generated by the first sensor and a signal generated by the second sensor.

4. The wastewater treatment system of claim 1, wherein the first membrane compartment is fluidly connected to an outlet of the first compartment, the system further comprising:
   a second membrane compartment fluidly an outlet of the second compartment.

5. The wastewater treatment system of claim 4, further comprising:
   a first recirculation line fluidly connected to an outlet of the first membrane compartment; and
   a third sensor positioned at an outlet of the first membrane compartment.

6. The wastewater treatment system of claim 5, further comprising:
   a second recirculation line fluidly connected to an outlet of the second membrane compartment; and
   a fourth sensor positioned at an outlet of the second membrane compartment.

7. The wastewater treatment system of claim 6, wherein the controller is in communication with the outlet of the first membrane compartment and the outlet of the second membrane compartment, the controller configured to provide a third control signal response to the third sensor to adjust flow from the first membrane compartment to the first recirculation line, and a fourth control signal responsive to the fourth sensor to adjust flow from the second membrane compartment to the second recirculation line.

8. The wastewater treatment system of claim 7, wherein the controller is in communication with a recirculation inlet in the first compartment and a recirculation inlet of the second compartment, the controller configured to proved a fifth control signal responsive to the first sensor to adjust flow from the recirculation line to the recirculation inlet of the first compartment, and a sixth control signal responsive to the second sensor to adjust flow from the recirculation line to recirculation inlet of the second compartment.

9. The wastewater treatment system of claim 7, wherein the controller is in communication with the first jet assembly in the first compartment and the second jet assembly in the second compartment, the controller configured to provide a seventh control signal responsive to the first sensor to adjust the flow of air into the first jet assembly of the first compartment, and an eighth control signal responsive to the second sensor to adjust the flow of air into the second jet assembly of the second compartment.

10. The wastewater system of claim 1, wherein an inlet to the first membrane compartment is fluidly connected to an outlet of the first compartment and an outlet of the second compartment.

11. The wastewater system of claim 10, further comprising a recirculation line fluidly connected to an outlet of the first membrane compartment and to a first recirculation inlet of the first compartment and a second recirculation inlet of the second compartment.

12. The wastewater system of claim 11, further comprising:
a fifth sensor positioned in the recirculation line; and
a second switchover device positioned on the recirculation line downstream of the outlet of the first membrane compartment and upstream of the first and second recirculation inlets.

13. The wastewater system of claim 12, further comprising a controller in communication with the second switchover device; the controller configured to generate a ninth control signal responsive to a signal generated by the fifth sensor to interrupt flow of concentrated mixed liquor to one of the first and the second recirculation inlets and to direct flow of concentrated mixed to the other of the first and the second recirculation inlets.

* * * * *